United States Patent [19]

Mitchell

[11] Patent Number: 4,997,266

[45] Date of Patent: Mar. 5, 1991

[54] EXAMINATION SLIDE GRID SYSTEM

[75] Inventor: Vance C. Mitchell, Irvine, Calif.

[73] Assignee: Hycor Biomedical, Inc., Garden Grove, Calif.

[21] Appl. No.: 520,954

[22] Filed: May 9, 1990

Related U.S. Application Data

[63] Continuation of Ser. No. 148,870, Jan. 27, 1988, abandoned.

[51] Int. Cl.⁵ .............................................. G02B 21/34
[52] U.S. Cl. ................................ 350/535; 219/121.65; 219/69.14; 350/536; 356/246
[58] Field of Search .............. 219/69 D, 69 E, 121.65; 350/534, 535, 536; 356/244, 246

[56] References Cited

U.S. PATENT DOCUMENTS

| | | | |
|---|---|---|---|
| 1,647,865 | 11/1927 | Hausser | 350/535 |
| 1,824,097 | 9/1931 | Ott | 350/535 |
| 1,918,351 | 7/1933 | Schulze | 350/535 |
| 1,994,483 | 3/1935 | Ott | 350/535 |
| 2,415,480 | 2/1947 | Gassert | 350/535 |
| 3,777,283 | 12/1973 | Elkins | 350/536 |
| 4,455,893 | 6/1984 | Astero | 219/121.65 |
| 4,637,693 | 1/1987 | Mitchell | 350/536 |

FOREIGN PATENT DOCUMENTS 156259  9/1956  Sweden ................................ 350/536

Primary Examiner—Bruce Y. Arnold
Assistant Examiner—Martin Lerner
Attorney, Agent, or Firm—Edward S. Irons

[57] ABSTRACT

A method of forming an eroded pattern on a metal part using Electrical Discharge Machining (EDM) comprising: forming a pattern of electrodes on the end of a piece of electrode material by using wire EDM, the pattern of electrodes being the pattern to be eroded on the metal part or being a portion of the pattern; and mounting the metal part for EDM with the pattern of electrodes being mounted for use as electrodes and the erosion of the pattern or portion of the pattern provided by the pattern of electrodes by EDM in the metal part.

1 Claim, 2 Drawing Sheets

1

EXAMINATION SLIDE GRID SYSTEM

FIELD OF THE INVENTION

This application is a continuation of U.S. Ser. No. 07/148,870 filed Jan. 27, 1988, now abandoned.

This invention relates generally to the examination of liquid specimens and more particularly to an improved transparent slide for receiving and retaining a thin film of a liquid specimen with a grid marked out on the floor of the slide to facilitate counting, under magnification, of objects in the thin film specimen.

BACKGROUND OF THE INVENTION

Blood, spinal fluid, cell cultures and urine are examples of biological fluids which are microscopically examined to determine the presence or concentration of suspended particulate matter such as cells. For many years microscopic examination of liquid specimens had been accomplished by placing a drop of the specimen liquid on a flat transparent microscope slide and then placing a thin flat transparent cover slip over the specimen. More recently preassembled plastic slides with at least one examination chamber formed between a base plate and cover plate have been used. Liquid specimens are introduced into the examination chambers by placing a drop of the liquid specimen adjacent to a chamber and having capillation draw the specimen into the chamber. Preassembled plastic slides of this type are taught in U.S. Pat. No. 4,637,693 issued Jan. 20, 1987.

In order to accurately determine the concentration of suspended particles or cells in a specimen, several parameters must be either measured or maintained at constant values. These parameters are the interior dimensions of the volume of the examination chamber where suspended particles or cells are being counted. It is taught in U.S. Pat. No. 4,637,693 how to make plastic slides with the roofs and floors of examination chambers fixed in parallel relationship to each other at a predetermined distance. Since the roofs and floors are parallel and at a fixed distance the only remaining dimension required in determining the volume of specimen liquid being examined is the lateral dimension of the field of view of the examining instrument, i.e., microscope. This lateral dimension varies depending on magnification and the optics used in the microscope. Therefore, standardization when using multiple microscopes requires either using microscopes having the same fields of view or calculating the differences in fields of view and factoring the differences into the counts of suspended particulate matter.

An alternative to working with the lateral extent of the field of view while still utilizing the same preassembled Plastic slide would be to incorporate a grid system on the floor of the examination chamber The preassembled slides are made of transparent optical quality plastic and therefore the grid must either be machined or scribed onto the floor plate of the slide after molding or must be a pattern incorporated in the mold used to make the base portion of the slide. The most efficient process would be to have the grid pattern incorporated in the mold.

Many applications require magnification of the order of 400 times. At this magnification the diameter of the fields of view vary from about 0.33 millimeters (mm) to 0.50 mm. So useful grid systems must be set up with defining lines separated by less than half a mm and accordingly very narrow lines such as 0.025 mm wide should be used. Otherwise, portions of the grid perimeter will extend beyond the field of view requiring adjustments to the microscope thus effectively defeating the purpose of the grid.

Previously, grids have been directly etched on glass slide bases for hemacytometers with lines of 0.013 mm width However, up to the time of the present invention, trying to get such fine line widths on metal mold parts used to make preassembled plastic slides have not been successful. For example, line widths could only be reduced to 0.076 to 0.13 mm using milling machine and tool bit techniques.

SUMMARY OF THE INVENTION

The present invention involves an electrical arc erosion technique for marking a grid system on metal mold inserts that are used to make the examination chamber floor surfaces on plastic slide bases. As taught in U.S. Pat. No. 4,637,693, the plastic slide bases can have multiple floor surfaces for examination chambers. Each of these slide floor surfaces must have optical quality finishes. Otherwise, light will be scattered from scratches and pits so as to cause an illumination background obscuring suspended particulate matter in the examination chambers. To provide optical quality surfaces on the floors of examination chambers, the portions of the molds, called mold inserts, where the examination floor surfaces are formed are made of optical quality stainless steel, i.e., free of pits and voids, and are polished to an optical quality finish, i.e., to a mirror finish. Then when the slide base is made in the mold, the examination chamber floor surfaces are produced with optical quality finishes Making a mold to put a grid system on examination floor surfaces requires removing material from the polished mold inserts along the lines for the grid system. By the present invention, a method has been found for precisely removing material from polished surfaces. Most importantly, the precision removal is accomplished with line-widths of 0.012 to 0.023 mm.

The method utilizes Electrical Discharge Machining (EDM). By this known type of machining a metal mold insert which is to be machined is submerged in a non-conductive fluid and connected to ground. Then an electrode is lowered into the non-conductive fluid and adjacent the surface of the mold insert to be machined. When the electrical potential between the grounded mold insert and electrode reaches the break down potential, an arc is formed which erodes both the surface of the mold insert to be machined and that of the electrode The depth of the erosion in the mold insert depends on the distance between the surface of the mold insert and the electrode and also on the amount of electrical potential between the electrode and the grounded mold insert. The width of the line depends on the width of the electrode and the amount of electrical potential between the electrode and the grounded mold insert. For example, using standard EDM equipment with an electrode 0.013 mm thick results in erosion widths between 0.025 to 0.036 mm. A consequence of using thin electrodes is that they can bend, in fact forces caused by arcing alone can bend thin electrodes. An electrode which bends results in a wavy line. Therefore, there is a trade off between a narrow electrode to produce a narrow line and a thick electrode to avoid wavy lines.

To overcome these problems, a preferred embodiment of the present invention uses a set of parallel electrodes which do not bend and which can be used to simultaneously erode a parallel set of lines for a grid system. Rotation of ninety degrees between a mold insert and the electrodes permits erosion of a second set of lines for the grid system. To make the electrodes, a block of sintered copper-tungsten matrix is machined to have a raised platform with a flat top. With the sintered copper-tungsten matrix arranged as the grounded work piece, an EDM machine with a wire electrode is used to erode material from the raised platform to form parallel raised electrodes. Each electrode can be made 0.013 mm wide and 0.051 mm high. They can be spaced 0.33 mm apart so that a pattern of 0.33 mm square markings can be eroded to set out the grid system.

BRIEF DESCRIPTION OF THE DRAWINGS

Corresponding components are designated by the same reference numerals throughout the various figures.

DETAILED DESCRIPTION OF THE INVENTION

Figure 1:
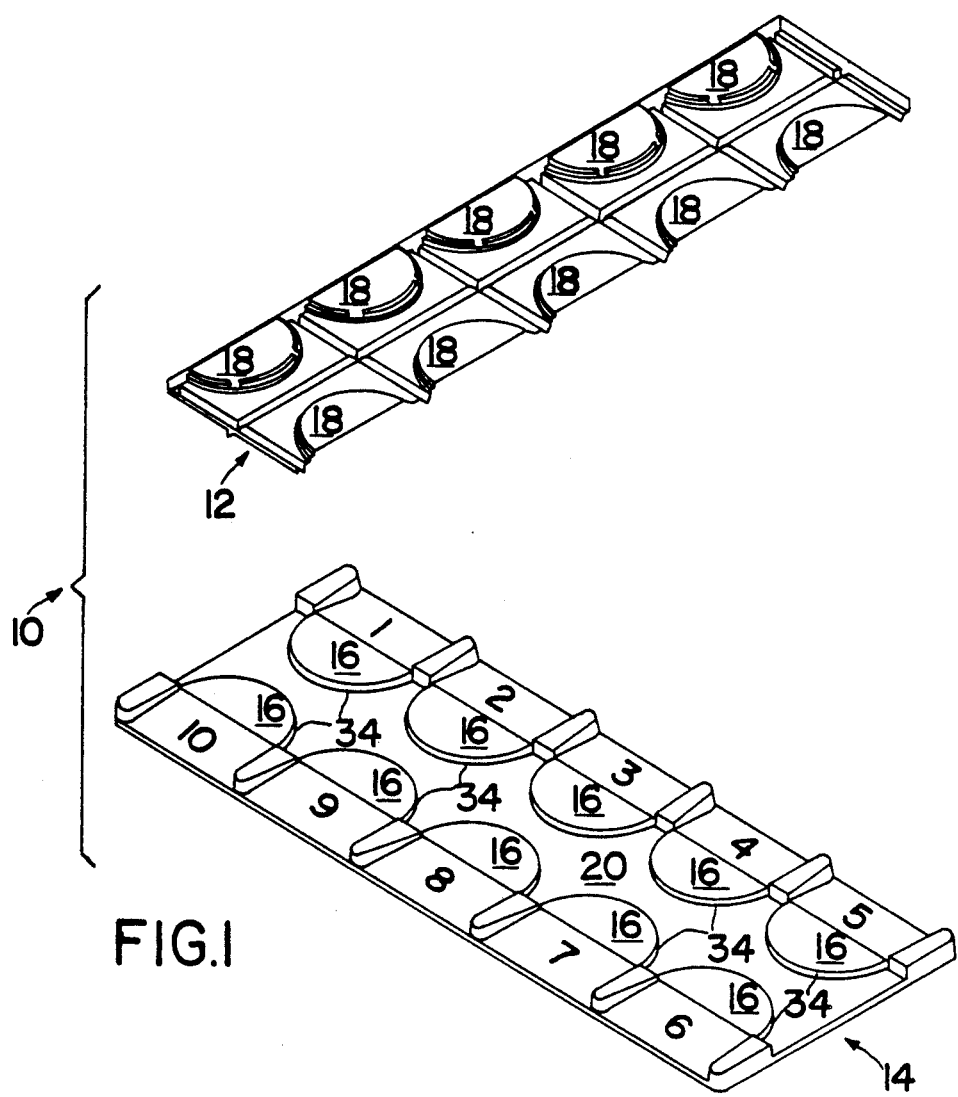
FIG. 1 is an exploded view of a slide base and cover which, when assembled, have ten examination chambers.
Figure 2:
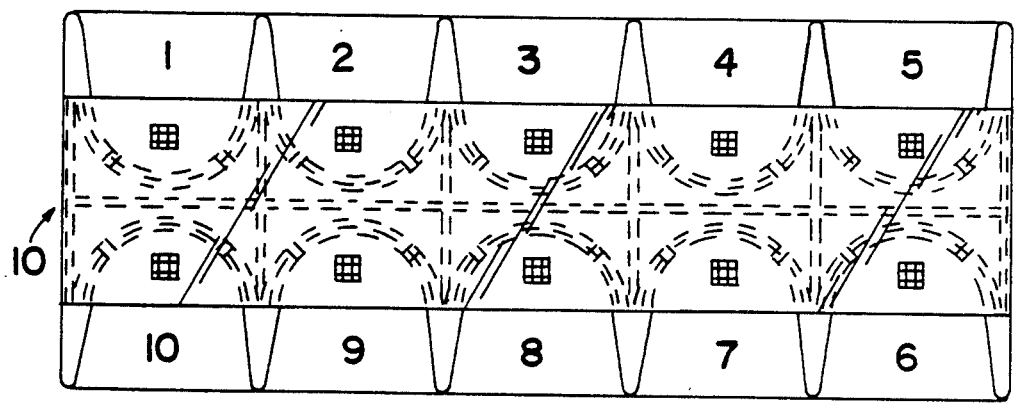
FIG. 2 is a top plan view of an assembled slide with a grid system that can be made using mold inserts eroded by the method of the present invention.

Referring now to the drawings, an exploded perspective view of a slide on which a grid can be formed using the method of the present invention is illustrated in FIG. 1 where the slide is generally designated by reference numeral 10. The slide 10 includes a plastic cover plate 12 and a plastic base plate 14. A top plan view of an assembled slide 10 is shown in FIG. 2. This type of slide, 10, is specifically discussed in U.S. Pat. No. 4,637,693.

The base plate 14 for a slide 10 includes examination chamber floor surfaces 16 which are flat optically smooth surfaces. The cover plate 12 has examination chamber roof surfaces 18, which like the examination chamber floor surfaces 16, are flat and optically smooth surfaces To form the base plates 14 and cover plates 12 with examination chamber floor surfaces 16 and examination chamber roof surfaces 18, molds are used with optical quality plastic. The portions of the molds where the examination chamber roof surfaces 18 and floor surfaces 16 are formed are made of optical quality stainless steel and polished to mirror surface finishes.

Figure 3:
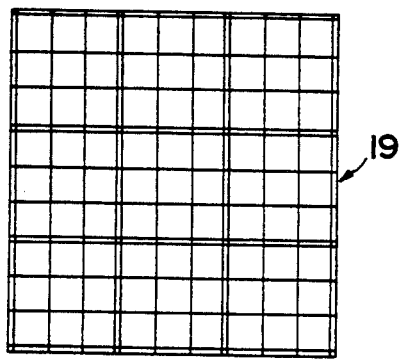
FIG. 3 is a top plan view of a grid system which can be formed on slides as shown in FIG. 2.
Figure 5:
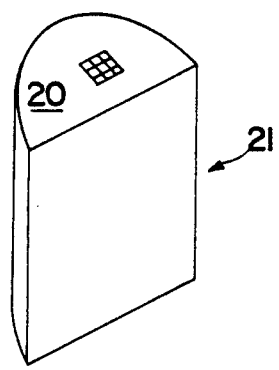
FIG. 5 is a perspective view of an optical quality mold insert on which a grid system of the present invention has been eroded.

By the method of the present invention, the grid system 19 shown in FIG. 3 is formed on the examination chamber floor surfaces 16. The process involves erosion of the polished mirror surfaces 20 (see FIG. 5) of the mold inserts 21 used to form the examination chamber floor surfaces 16. The erosion of the polished mirror surfaces 20 is accomplished using Electrical Discharge Machining (EDM). Before EDM can be used to erode any pattern on the polished mirror surfaces 20 an electrode must be made. The electrode needs to be made so as to meet the requirements of eroding straight lines which are narrow and not very deep. Control of the depth of erosion can be accomplished by adjusting the voltage and current applied to an electrode and the distance maintained between the electrode and the polished metal surfaces 20 as is known in the art of EDM. The width of the line is dependent on the applied voltage and current, and also on the width of the electrode. As discussed above as the electrode is narrowed, its strength and resistance to bending are accordingly reduced.

Figure 4:
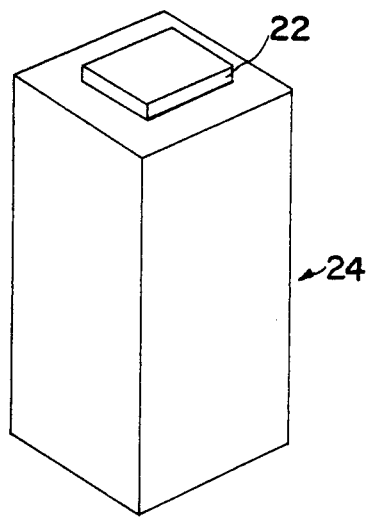
FIG. 4 is a perspective view of an electrode assembly block on which electrodes of the present invention are made.
Figure 6:
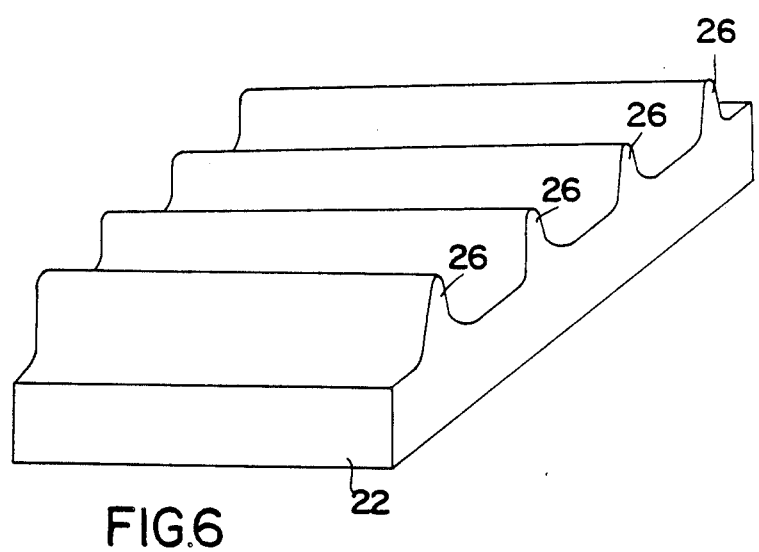
FIG. 6 is a perspective view of the raised platform on the electrode assembly block shown in FIG. 4 showing formed electrodes.

Before the electrode of the present invention can be made, the material from which it is to be made must be selected. The material needs to be electrically conductive, have a very high melting point, and be strong. Copper, for example, is a good electrical conductor but is not strong. It can be easily bent and erodes quickly when used as an electrode in EDM. Tungsten is also an electrical conductor and is very strong, but is difficult to machine. For the preferred embodiment here it has been found that sintered copper-tungsten matrix is a good material to use as an electrode. As shown in FIG. 4, an electrode assembly, generally designated as 24 is machined using known machine shop equipment such as grinders to provide a raised pedestal 22 with a smooth flat surface at one end of the electrode assembly 24. On the smooth flat surface of the electrode assembly 24 a pattern of electrodes is formed using wire EDM. The electrodes 26 as formed on an electrode assembly 24 are shown in FIG. 6. To form the electrodes 26, a wire EDM is used, the electrode assembly 24 is immersed in deionized water and an electrical potential of 40 volts with a current of 0.4 amperes is supplied between a wire running parallel to the electrodes 26 to be formed on the surface of the electrode assembly 24. Each electrode 26 formed by wire EDM is 0.013 mm wide by 0.051 mm high and approximately 1 mm long. The electrodes 26 are spaced 0.33 mm apart.

This electrode assembly 24 can be used to produce all of the lines in the grid pattern shown in FIG. 3 except the double paired lines. The double paired lines are spaced 0.038 mm apart. Electrodes 26 can not be formed on one electrode assembly 24 at such a narrow spacing because the wire EDM uses a 0.102 mm diameter wire with a 0.025 mm spark gap around the wire which mandates a minimum spacing between electrodes 26 of 0.152 mm. To make the double paired lines, an electrode 26 for each one of the pair has to be made on a separate electrode assembly 24. So a second electrode assembly 24 is made with only electrodes 26 for the second line of each pair. The width, height and length of each electrode 26 on the second electrode assembly 24 is the same as those of the electrodes 26 on the first electrode assembly 24.

Either electrode assembly 24 can be used first to form the grid pattern on the polished metal surface 20 of a slide mold insert 21. The process involves accurately mounting the polished metal surface 20 as the grounded part in a bath of non-conductive, high flash point oil, and mounting one of the electrode assemblies 24 above the grounded polished metal surface 20 so it can be lowered to erode a pattern of parallel lines at the correct location on the polished metal surface 20. To erode the pattern of lines, a 50 volt and 0.2 ampere electrical signal is applied between the grounded Polished metal surface 20 and the electrode assembly 24. This system permits erosion of lines 0.012 to 0.023 mm wide and 0.008 mm deep.

When using sintered copper-tungsten matrix material for the electrode assemblies 24, it has been found that pits can develop in the electrodes 26 at locations where there were nodes of copper which erode faster than tungsten. Such pits leave interruptions and gaps in the lines eroded on polished metal surfaces 20. To eliminate such interruptions and gaps, the electrode assembly 24, after eroding a set of parallel lines, is shifted by 0.1 mm with respect to the grounded polished metal surface 20 and again applied to erode the same lines. After the second use of the electrode assembly 24, the electrode assembly 24 is rotated ninety degrees with respect to the eroded parallel lines and a second set of perpendicular lines is eroded. This second set of lines is also eroded twice to assure elimination of interruptions and gaps. At this point, the electrode assembly 24 is changed and the second electrode assembly 24 is used for the final erosion of lines on the polished metal surface 20 following the same steps as were used with the first electrode assembly 24.

Upon completion of erosion of grid patterns on polished metal surfaces 20 for the necessary number of mold inserts 21 for a mold to make slide bases, the mold can be assembled and slides made using optical quality clear plastic. The resulting grid patterns on examination chamber floor surfaces 16 have lines as narrow as 0.012 mm which is about 15 microns wide and provides a distinct but not over proportioned line in comparison to, for example, red blood cells which are 5-10 microns in diameter. The height of the lines is 0.008 mm which avoids the problem of cells being strained out by the grid pattern when the liquid specimen is drawn into an examination chamber. The quality of the edges of the lines is another benefit. The edges of the lines of the grid pattern 19 made on the examination chamber floor surfaces 16 by the method of the present invention are sharp and distinct. These qualities aid in identification of objects on and adjacent the lines. In combination, the width, height and distinct edges of the lines sets out areas where, after a liquid specimen is injected in an examination chamber, particulate matter can settle so accurate count can be made. That particulate matter settling about a line will settle on one side or the other with a 50—50 probability because of the symmetric shape of the lines.

Although the invention has been specifically illustrated by an embodiment, various modifications and additions are encompassed by the invention as set out in the claims. For example, electrode assemblies can be made to erode patterns of lines on mold parts for making all types of optical components such as reticles and diffraction patterns. Essentially any finely lined pattern that needs to be made can be by the process of the present invention.

What is claimed is:

1. A transport plastic microscopic slide assembly adapted for examination of liquid specimens comprising in combination:

a slide cover plate bonded to a slide base plate with at least one examination chamber formed between said slide cover plate and said slide base plate for receiving a liquid specimen; said examination chamber having a flat, optically smooth floor surface bearing raised and defined by lines 0.012 to 0.023 mm wide and 0.008 mm high;

each of said slide cover plate and said slide base plate formed by molding plastic, the mold including eroded patterns to form said grid on said examination floor surface.

* * * * *